US009483491B2

(12) United States Patent
Wijayaratne et al.

(10) Patent No.: US 9,483,491 B2
(45) Date of Patent: Nov. 1, 2016

(54) FLEXIBLE PERMISSION MANAGEMENT FRAMEWORK FOR CLOUD ATTACHED FILE SYSTEMS

(71) Applicant: Egnyte, Inc., Mountain View, CA (US)

(72) Inventors: Ravi Wijayaratne, San Jose, CA (US); Ray White, San Jose, CA (US); Manish Marathe, San Jose, CA (US); Aahz, San Carlos, CA (US); Rajesh Ram, Union City, CA (US); Amrit Jassal, Morgan Hill, CA (US)

(73) Assignee: EGNYTE, INC., Mountain View, CA (US)

( * ) Notice: Subject to any disclaimer, the term of this patent is extended or adjusted under 35 U.S.C. 154(b) by 487 days.

(21) Appl. No.: 13/689,648

(22) Filed: Nov. 29, 2012

(65) Prior Publication Data
US 2014/0149461 A1      May 29, 2014

Related U.S. Application Data

(60) Provisional application No. 61/564,628, filed on Nov. 29, 2011.

(51) Int. Cl.
| G06F 7/00 | (2006.01) |
| G06F 17/30 | (2006.01) |
| G06F 21/62 | (2013.01) |

(52) U.S. Cl.
CPC ..... *G06F 17/30194* (2013.01); *G06F 21/6236* (2013.01)

(58) Field of Classification Search
USPC ........................................................ 707/785
See application file for complete search history.

(56) References Cited

U.S. PATENT DOCUMENTS

| 2006/0129627 A1* | 6/2006 | Phillips et al. ............... 709/200 |
| 2010/0070870 A1* | 3/2010 | Halperin et al. .............. 715/742 |
| 2010/0077026 A1* | 3/2010 | Watanabe et al. ............ 709/203 |
| 2010/0241668 A1* | 9/2010 | Susanto et al. ............... 707/784 |

* cited by examiner

*Primary Examiner* — Alex Gofman
*Assistant Examiner* — Muluemebet Gurmu
(74) *Attorney, Agent, or Firm* — Larry E. Henneman, Jr.; Gregory P. Gibson; Henneman & Associates, PLC

(57) ABSTRACT

A method of managing file permissions in a remote file storage system includes defining permissions for the remote file storage system and controlling access to objects on the remote file storage system according to the permissions of the remote file storage system. The permissions are transferred to a client file storage system remote from the remote file storage system, and access to objects on the client file storage system is controlled according to the permissions of the remote file storage system. A remote file storage system includes a permissions file generator operative to generate a permissions file, which is transmitted to a client file storage system for enforcement at the client file storage system.

26 Claims, 10 Drawing Sheets

| |
|---|
| Map Name |
| Map Version |
| Next Map |
| Generation Number |
| Timestamp |
| Total Filesystem Elements |
| Total ACEs |
| Total List Elements |
| Filesystem Element Offset |
| Filesystem Element Size |
| Next Free Filesystem Element |
| Name Element Offset |
| Name Element Size |
| Next Free Name Element |
| ACL Offset |
| ACL Size |
| Next Free ACL Offset |
| Child List Offset |
| Child List Size |
| Next Free Child List |
| Memory |

Fig. 7

FLEXIBLE PERMISSION MANAGEMENT FRAMEWORK FOR CLOUD ATTACHED FILE SYSTEMS

RELATED APPLICATIONS

This application is a nonprovisional application that claims the benefit of copending U.S. Provisional Patent Application No. 61/564,628, filed Nov. 29, 2011 by the same inventors and entitled "Flexible Permission Management Framework For Cloud Attached File Systems", which is incorporated herein by reference in its entirety.

BACKGROUND

1. Field of the Invention

This invention relates generally to cloud computing systems, and more particularly to cloud file storage systems. Even more particularly, this invention relates to the management of file permissions for cloud attached file systems.

2. Description of the Background Art

Cloud computing systems are known. In cloud computing systems, computing and storage services are provided to remote clients over a wide area network such as the Internet.

If the remote clients are using a file system that is different from that of the cloud storage server, then problems can occur in the handling of the permissions for the stored files. The problems are compounded when several different networked file system clients are accessing the local file system and the cloud collaboratively.

What is needed, therefore, is a unified permission framework associated with the cloud and the local fileserver.

SUMMARY

The present invention overcomes the problems associated with the prior art by providing a virtual file system with an associated permission framework. The invention facilitates overriding the original file system permissions (e.g., of a local file storage system) to superimpose a cloud based permission scheme. The permission scheme overlay is done in such a way as to minimize its impact on the file system operations.

An embodiment of the invention is based on a novel permission data structure that uses access control lists ("ACLs"). The example data structure enables efficiently storing a variable-size access control list data structure in contiguous memory, facilitating storing and retrieving the permission rules without any additional processing.

Another advantage is that repeated enforcement processing is prevented by the permission enforcement framework caching enforcement decisions on a TLB.

Yet another advantage is that methods of the invention can be extended to superimpose any cloud permission framework on a fileserver file system.

An example remote file storage system (e.g., a cloud file server) includes memory for storing file objects received from a client, a client interface, a permissions file generator, and a permissions enforcer. The client interface is operative to receive the file objects from a client, to provide the file objects to the client, to receive data indicative of permissions associated with the file objects, and to provide a permissions file to the client. The permissions file generator is operative to generate a permissions file based on the data indicative of the permissions associated with the file objects, and the permissions enforcer is operative to control access to the file objects according to the permissions file. A virtual file system module is operative to define a virtual file system structure for the file objects, and the permissions file generator is operative to generate the permissions file based at least in part on the virtual file system structure. As shown by way of example, the permissions file associates access control lists (ACLs) with the file objects. In a disclosed embodiment, the remote file server includes a processing unit, and the permissions file generator and the permissions enforcer are code modules executed by the processing unit.

Synchronization is maintained between the permission files on the local and remote file storage systems. In an example embodiment, the client interface is also operative to receive additional data indicative of permissions associated with the file objects (e.g., changes, new files, etc.). Then, the permissions file generator is operative to generate an updated permissions file based at least in part on the additional data indicative of permissions associated with the file objects. The client interface then provides the updated permissions file to the client (e.g., to the local file storage system of the client). In a particular embodiment, a synchronizer is operative to synchronize the file objects stored on the remote file storage system with file objects stored on a file storage system of the client, and also to synchronize the permissions file with a permissions file on the file storage system of the client.

A local file storage system (e.g., office local cloud) for use with a remote file storage system (e.g., a cloud file server) is also disclosed. The local file storage system includes memory for storing file objects from local clients, a client interface, a remote file server interface, and a permissions enforcer. The client interface is operative to receive the file objects from local clients and to provide the file objects to the clients. The remote file server interface is operative to receive a permissions file indicative of permissions associated with the file objects from a remote file server. The permissions enforcer is operative to control access to the file objects by the local clients according to the permissions file.

In a particular embodiment, the local file storage system additionally includes a virtual file system module operative to present a virtual file system structure associated with the file objects to the local clients. The permissions file is based at least in part on the virtual file system structure. For example, the permissions file associates access control lists with elements of the virtual file structure.

An example hybrid file storage system (e.g., local file storage system in combination with a remote file storage system) is also disclosed. The example hybrid file storage system includes a local file storage system for storing and providing file objects to local clients and a remote file storage system for storing and providing copies of the file objects. A permissions file generator on at least one of the local file storage system and the remote file storage system is operative to generate a permissions file and to provide the permissions file to the local file storage system and the remote file storage system. A first permissions enforcer on the local file storage system is operative to control access to the file objects on the local file storage system according to the permissions file, and a second permissions enforcer on the remote file storage system is operative to control access to the file objects on the remote file storage system according to the permissions file. In the example embodiment, a file object synchronizer is operative to synchronize the file objects stored on the remote server and the file objects stored on the local server. In addition, a permissions file synchronizer is operative to synchronize the permissions file on the remote server and the permissions file on the local server.

A method of managing file permissions in a remote file storage system is also disclosed. An example method includes defining permissions for the remote file storage system and controlling access to objects on the remote file storage system according to the permissions of the remote file storage system. The method also includes transferring the permissions to a client file storage system remote from the remote file storage system and controlling access to objects on the client file storage system according to the permissions of the remote file storage system. A virtual file system structure for the objects on the remote file storage system is defined, and the permissions framework is defined based at least in part on the virtual file system structure. Controlling access to objects on the client file storage system according to the permissions of the remote file storage system includes overriding permissions of the client file storage system.

The example method additionally includes altering the permissions of the remote file storage system at the remote file storage system and controlling access to objects on the remote file storage system according to the altered permissions of the remote file storage system. The altered permissions are transferred to the client file storage system, and access to objects on the client file storage system is controlled according to the altered permissions of the remote file storage system. Optionally, the step of transferring the altered permissions to the client file storage system occurs in conjunction with a data synchronization process between the remote file storage system and the client file storage system. As another option, the step of transferring the altered permissions to the client file storage system can occur in response to an explicit command from a user. As yet another option, the step of transferring the altered permissions to the client file storage system can occur in response to the step of altering the permissions.

Alternatively, the example method additionally includes altering the permissions of the remote file storage system at the client file storage system and controlling access to objects on the client file storage system according to the altered permissions of the remote file storage system. The altered permissions are transferred to the remote file storage system; and access to objects on the remote file storage system is then controlled according to the altered permissions of the remote file storage system. Optionally, the step of transferring the altered permissions to the remote file storage system occurs in conjunction with a data synchronization process between the remote file storage system and the client file storage system. As another option, the step of transferring the altered permissions to the remote file storage system can occur in response to an explicit command from a user. As yet another option, the step of transferring the altered permissions to the remote file storage system can occur in response to the step of altering the permissions.

In an example method, the step of defining permissions for the remote file storage system includes associating access control lists with the objects on the remote file storage system.

A remote file storage system can define permissions for a plurality of different clients using the remote file storage system. An example method to do so additionally includes defining a plurality of permissions sets for the remote file storage system and associating each of the permissions sets with a respective one of a plurality of clients. The method additionally includes controlling access to objects on the remote file storage system by the clients according to the permissions sets of the remote file storage system. Each of the permissions sets is transferred to a respective one of a plurality of client file storage systems. Each client file storage system is associated with one of the plurality of clients and is located remotely with respect to the remote file storage system. Access to objects on each client file storage systems is controlled according to the permission set of the remote file storage system associated with the respective client.

BRIEF DESCRIPTION OF THE DRAWINGS

The present invention is described with reference to the following drawings, wherein like reference numbers denote substantially similar elements:

FIG. 7 is an example data structure for the header field of the data structure of FIG. 4;

DETAILED DESCRIPTION

The present invention overcomes the problems associated with the prior art, by providing a flexible permission management framework for cloud attached file systems. In the following description, numerous specific details are set forth in order to provide a thorough understanding of the invention. Those skilled in the art will recognize, however, that the invention may be practiced apart from these specific details. In other instances, details of well-known cloud computing practices and components have been omitted, so as not to unnecessarily obscure the present invention. For example, the invention is described with reference to a cloud file storage server. However, aspects of the invention can be advantageously used on fileservers with any cloud-based permission scheme.

Figure 1:
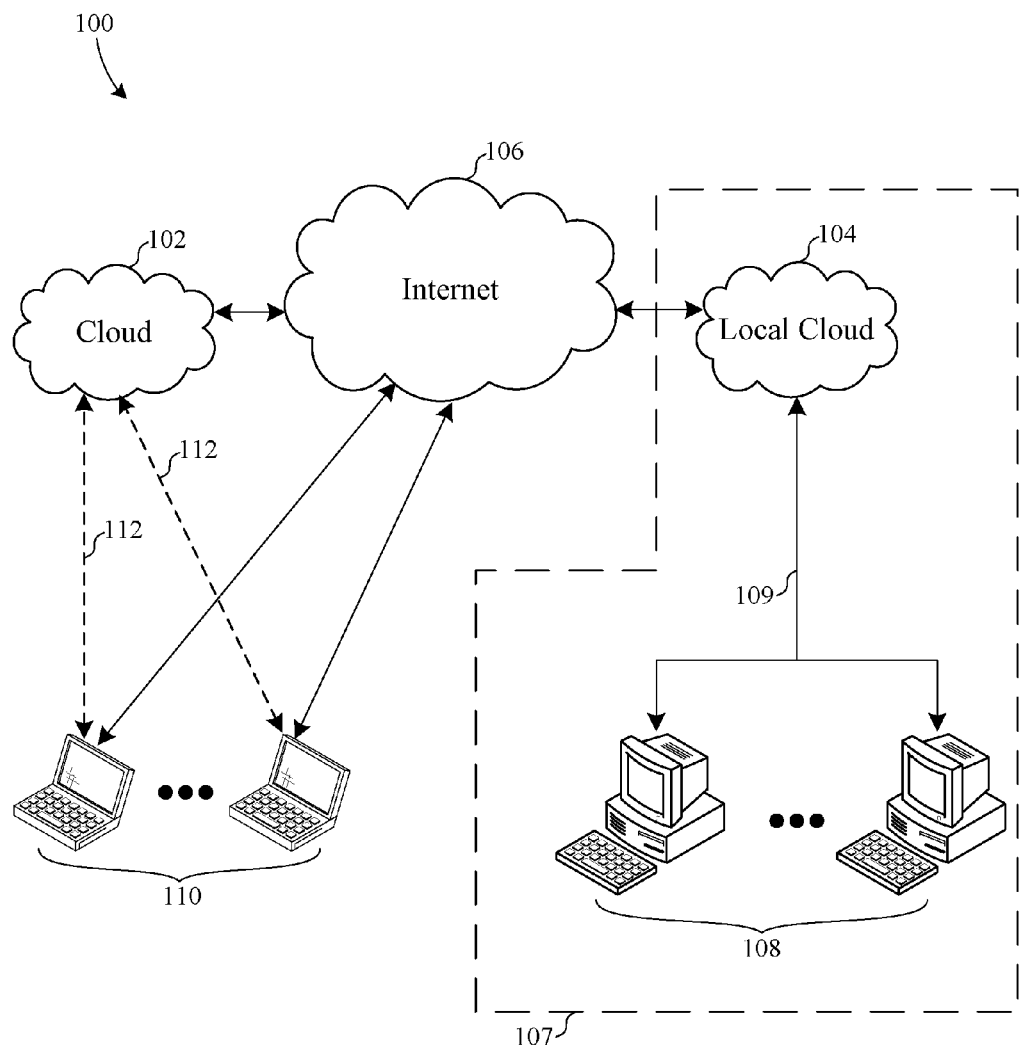
FIG. 1 is a diagram of a cloud computing system.

FIG. 1 shows a cloud computing system 100 to include a cloud server 102 and a local cloud server 104, which communicate and are synchronized via the Internet 106. Local cloud 104 can be hosted by a file server in an office 107 and is, therefore, sometimes referred to as an office local cloud (OLC). Local clients 108 can access cloud files by directly accessing files/objects stored on local cloud 104, via a local network 109. Remote clients 110 can access cloud files by accessing files/objects stored on cloud 102, via Internet 106, or via some other connection 112 with cloud server 102. The local cloud server 104 is synchronized with the cloud server 102 to provide local data access and remote data security.

Figure 2:
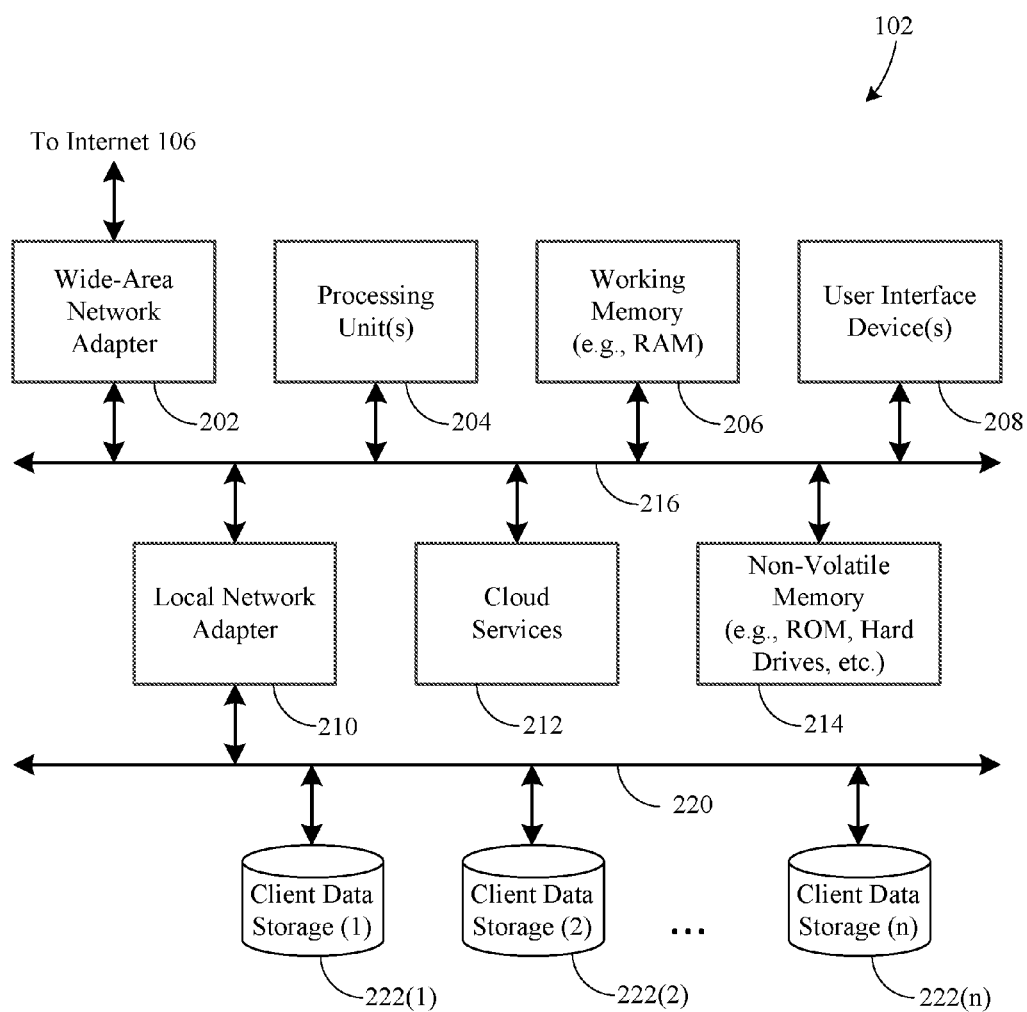
FIG. 2 is a block diagram of a remote cloud file storage server.

FIG. 2 is a block diagram of cloud server 102. Cloud server 102 includes a wide-area network adapter 202, one or more processing units 204, working memory 206, one or more user interface devices 208, a local network adapter 210, a cloud services component 212, and non-volatile memory 214, all intercommunicating via an internal bus 216. Processing units(s) 204 impart functionality to cloud server 102 by executing code stored in any or all of non-volatile memory 214, working memory 206, and cloud services 212. Cloud services 212 represents hardware, software, firmware, or some combination thereof, that provides the functionality of the flexible permission management framework described herein.

Wide area network adapter 202 provides a means for cloud server 102 to communicate with remote clients 108 and local cloud 104 via Internet 106. Local network adapter 210 provides a means for accessing a plurality of data storage devices 222(1-n), via a local private network 220. Clients' files are stored in and retrieved from data storage devices 222(1-n) as needed. Additional data storage devices 222(n+) can be added as needed to provide additional storage capacity. In this example embodiment, data storage devices 222 are network attached storage (NAS) devices, but any suitable type of storage device can be used.

Figure 3:
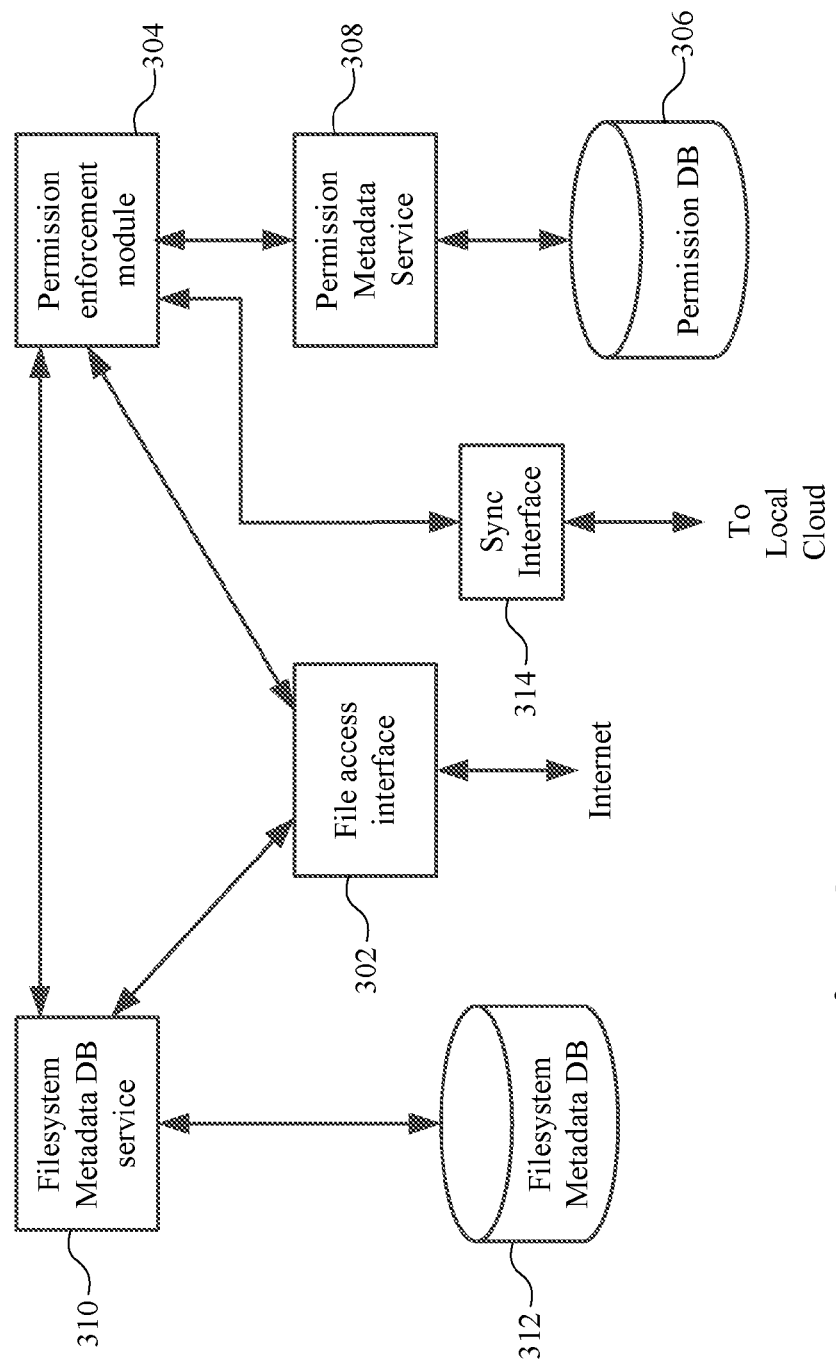
FIG. 3 is a relational diagram of the functional aspects of a virtual file system (VFS) permission framework implemented within the cloud computing system of FIG. 1.

FIG. 3 is a relational diagram of the functional aspects of a virtual file system (VFS) permission framework implemented within the cloud computing system of FIG. 1. In this illustrated embodiment, the functional aspects are provided by cloud services 212, but the functional elements of the system can be distributed across other service modules or even other machines.

Clients 110 access files stored on cloud server 102 via file access interface 302. Clients 110 can connect with file access interface 302 either via the Internet 106 or connections 112 (FIG. 1). Responsive to a client 110 request for a file or folder access, file access interface 302 enforces the cloud permissions scheme via a permission enforcement module 304. Permission enforcement module 304 accesses the access control lists (ACLs) stored in a permissions database via permission meta data service 308. Optionally, a special permission file is created based on the ACLs to facilitate more efficient enforcement of the permissions. If access is permitted after the permissions are enforced, file access interface 302 retrieves the requested object (file or folder), using a filesystem metadata database service 310 to access a filesystem metadata database 312, and provides the requested object to the client 110.

As will be described in greater detail, the permissions scheme of cloud server 102 is provided to local cloud 104 for enforcement at local cloud 104. A sync interface 314 is operative to provide permissions file(s) to local cloud 104 (and in some cases receive permission files from local cloud 104), so that the same permissions scheme can be implemented on both cloud 102 and local cloud 104. Sync interface 314 obtains the permission file(s) provided to local cloud 104 from permission enforcement module 304.

Figure 4:
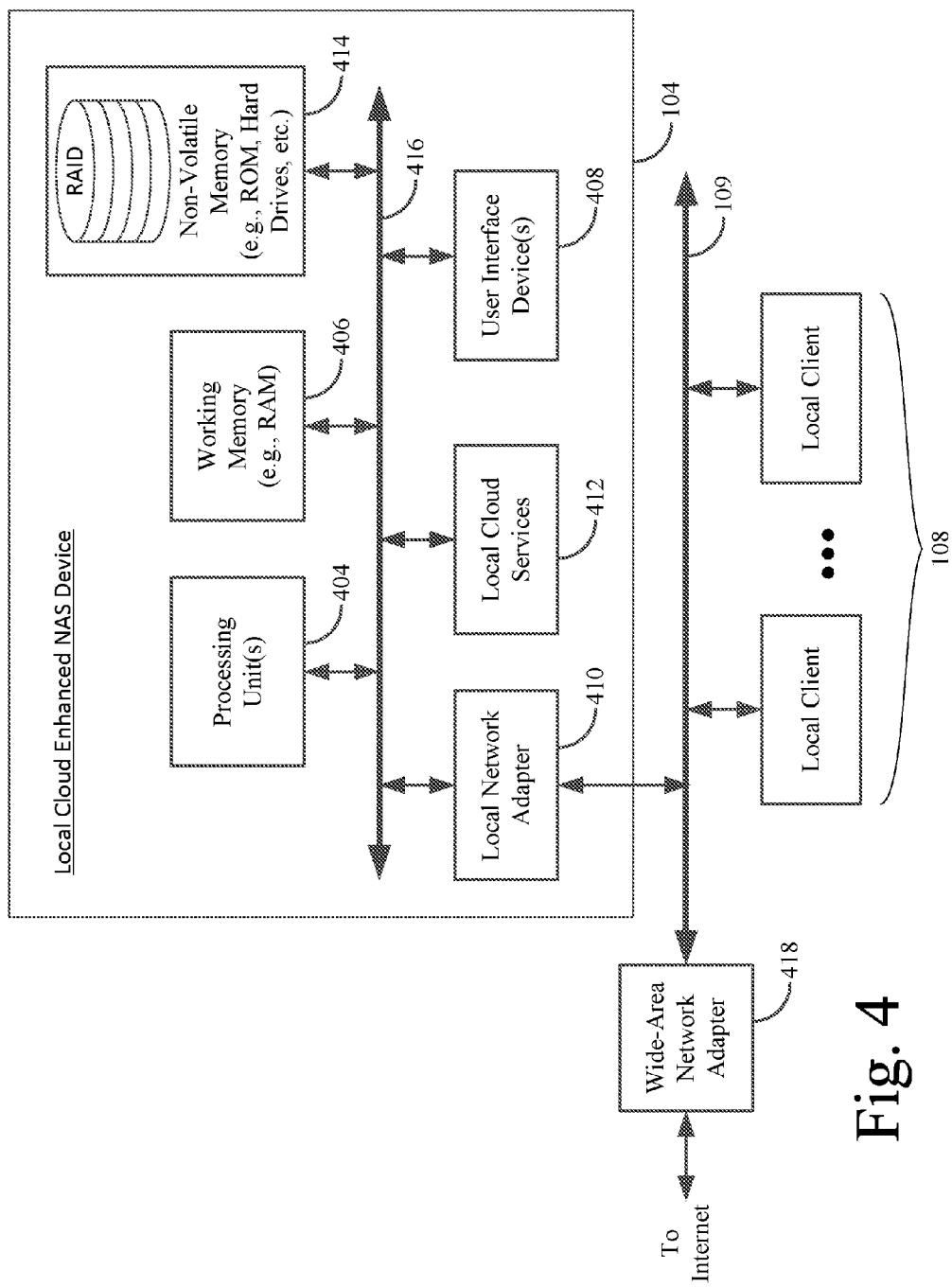
FIG. 4 is a block diagram of a local cloud file storage server.

FIG. 4 is a block diagram showing local cloud 104 in greater detail. In this particular embodiment, local cloud 104 is an enhanced network attached storage (NAS) device that includes one or more processing units 404, working memory 406, one or more user interface devices 408, a local network adapter 410, a local cloud services component 412, and non-volatile memory 414, all intercommunicating via an internal bus 416. Processing units(s) 204 impart functionality to local cloud server 104 by executing code stored in any or all of non-volatile memory 414, working memory 406, and local cloud services 412. A wide-area network adapter 418 facilitates communication with remote cloud 102 (FIG. 1) via local network 109 and the Internet 106.

Non-volatile memory 414 also provides storage for client files/objects. By way of example, the nonvolatile memory 414 is shown to include (in addition to other types of memory) a set of hard drives arranged in a RAID configuration. The client's files/objects on the RAID drives can be accessed by local clients 108 via local network 109, in accordance with the permissions framework described in greater detail below.

Local cloud services 412 represents hardware, software, firmware, or some combination thereof, that provides the functionality of the flexible permission management framework described herein. In addition to the permissions management functions which will be described in greater detail, local cloud services 412 also provides file storage and retrieval services to clients 108 and synchronizes the client files/objects stored in nonvolatile memory with the files/objects stored on cloud 102. The file storage and synchronization functions of local cloud services 412 will not be described in detail, except to the extent they relate to the permissions framework, so as not to unnecessarily complicate this disclosure.

Figure 5:
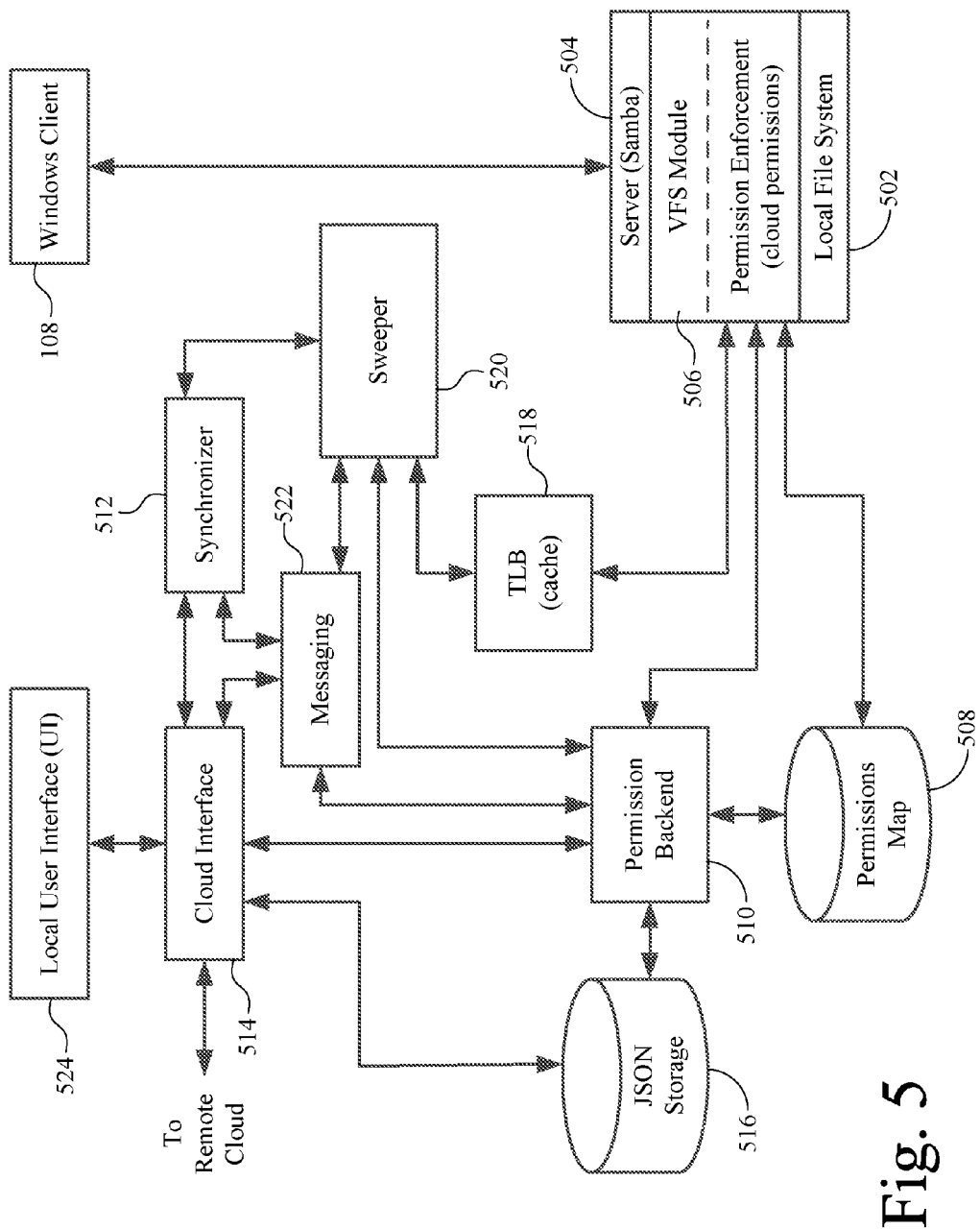
FIG. 5 is a relational diagram of the functional aspects of the local cloud services of the local cloud enhanced NAS device of FIG. 4.

FIG. 5 is a relational diagram of the functional aspects of local cloud services 412 of the local cloud enhanced NAS device 104 of FIG. 4. Local file system 502 represents the native file system of NAS device 104 (local cloud). A server application 504 receives requests for file operations (read, write, etc.) from clients 108 and services those requests via local file system 502. In this particular example, clients 108 are WINDOWS® clients, and server application 504 is Samba. However, the present invention is not limited to these particular examples. Rather, these particular examples, as well as others used in this disclosure, are merely used to provide a clear explanation of the invention. Indeed, a significant advantage of the present invention is that it can be implemented with a wide variety of server applications and file systems.

Windows client 108 is a device/process used to access the files in the file server. A user maps the "Share" that is exported by the file server via Server Messaging Block (SMB) protocol into the file system namespace of the Windows client and then accesses the files and folders within the exported share.

Samba 504 is the open source MS WINDOWS® networking protocol server (SMB protocol server). The Windows client 108 useS Server Messaging Block (SMB) protocol to access Windows file servers. Samba exports the files and folders residing in the file server to external Windows clients via SMB protocol.

Ordinarily, the file permission scheme of local cloud 104 would depend on local file system 502 and/or server 504. However, the permissions framework of cloud server 102 is imposed on local cloud 104 by interposing a virtual file system (VFS) module 506 between server 504 and local file system 502. Local file system 502 is responsible for organizing and giving access to the files and folders stored in nonvolatile memory 414. The contents of the local filesystem are only accessible natively via filesystem system calls. Samba exports these contents via Shares to Windows clients 108 over local network 109 via SMB protocol. VFS Module presents a virtual file system (e.g., a directory tree) to clients and imposes permissions based on that virtual file system. In particular, a permission enforcement process of VFS module 506 intercepts attempted file operations to local file system 502 and either permits or denies the file operations based on a permissions map (file) 508. Permissions map 508 defines the same permissions enforced by cloud 102, so that permissions are consistent whether a client attempts to access a file via cloud 102 or local cloud 104.

In greater detail, Samba 504 uses filesystem system call interface to access the files and folders residing in the local file system 502. Samba exports a standard API called Virtual File System (VFS) API to facilitate interception of these calls and manipulation the call stack. The example embodiment of the present invention uses the Samba VFS interface to intercept the filesystem system calls and change the file system behavior to accommodate cloud connectivity. VFS module 506 detects filesystem changes for synchronization purposes, so that only modified files need to be moved to cloud 102 to keep the file system of local cloud 104 synchronized with the file system of cloud 102.

VFS module 506 enforces the permissions of cloud 102 before the operating system of local cloud 104 enforces its own permissions on the filesystem system calls. VFS module 506 first intercepts the filesystem system call and enforces the cloud permissions. If the cloud permissions permit access, VFS modules 506 elevates the access privileges to "root" or "super user" access, thereby overriding operating system access. On the other hand, if the permission enforcement of VFS module 506 denies access, access is denied from VFS module 506 itself, without ever calling the native filesystem. Note that the cloud permission framework can be different than Unix or Windows ACL permission frameworks. Indeed, the cloud permission framework and imposing the cloud permission framework on local cloud 104 are considered to be separate, inventive aspects of the present invention. However, the particular cloud permission semantics are not essential elements of the invention.

In this example embodiment of the invention, the cloud permission framework uses access control lists (ACLs). The ACLs are optimized for performance and persisted on disk as permission map 508. However, permission map 508 is copied to working memory 406 for permission enforcement, to increase performance in accessing file system 502 via Samba 504.

Permission backend 510 is responsible for reading and managing the in-memory contents of permission map 508. Permission backend 510 manages a shared memory area of working memory 406 where permission map 508 is stored. This shared memory area is shared by many Samba protocol server processes to enforce permissions. When a new/altered permission map 508 is available, permission backend 510 enforces proper locking to seamlessly swap the prior permission map 508 with the new permission map 508 so that the new permissions schema will be enforced.

Synchronizer 512 is responsible for downloading the cloud permission schema to local cloud 104. The cloud 102 permission schema is downloaded, via cloud interface 514 and Internet 106, as an XML formatted file and transformed locally to Java Script Object Notation (JSON) format and stored in JSON storage for permission backend 510 to translate to the native-optimized permission map 508 format. Permission backend 510 parses/converts the contents of JSON storage 516 (JSON formatted permission schema) to construct optimized permission map 508.

The permission enforcement module of VFS Module 506 uses a translation lookup buffer (TLB) 518 to store recently enforced permission results for each process. Permission enforcement by the permission enforcement module includes traversing the cloud file system hierarchy and consolidating ACLs stored in each directory node in that cloud file system hierarchy. This requires a significant amount of processing, and this overhead is in the performance path of the networked file system 502 access. Storing the recently enforced results in TLB 518 avoids repeatedly incurring this performance overhead. During permission enforcement, the permission enforcement process of VFS module 506 first accesses TLB 518 to determine whether there is already an enforcement result for a given path stored therein. If there is no such result in the TLB, the permission enforcement process then goes through the detailed permission enforcement operation and stores the result in the TLB once the enforcement result is obtained. Because the TLB is an in-memory construct, stored per Samba process, TLB space is limited. Therefore only a predetermined number of the most recent permissions enforcement results are stored in the TLB.

Sweeper 520 is invoked at system startup time. Sweeper 520 is responsible for maintaining permission system configuration and instantiating the permission framework. Sweeper 520 is also responsible for starting the permission subsystem before the Samba protocol server.

Messaging module 522 coordinates communication between various modules/processes. For example, when synchronizer 512 causes a new permissions map 508 to be downloaded from cloud 102, synchronizer 512 instructs permission backend 512 to substitute the new permission map 508 for the old one. Messaging module 522 is responsible for conveying this information between synchronizer 512 and permission backend 510.

Cloud interface 514 is exported by cloud 102 and facilitates communications between cloud 102 and local cloud 104. Such communication includes, but is not limited to, synchronization of files systems and permissions between cloud 102 and local cloud 104. In addition, cloud interface 514 facilitates communication with a local user interface (UI) 524, which, for example, facilitates the administration of the local permissions functionality by a systems administrator.

An object of the invention is to eliminate current errors in permissions handling. Another object is increased efficiency.

At a high level, there will be a new data structure to describe the permissions associated with a file system tree. This will contain an element for each folder that has some permissions set, and will be passed between the client 104 and server 102 during synchronization. One will also be created by permission backend 510 from information received from the UI Backend.

The operation of an example embodiment of the VFS permission subsystem will now be described from the perspectives of cloud interface 514, permission storage backend, and the permission enforcement subsystem of VFS module 506.

First, operation from the perspective of cloud interface 514 will be described. The permissions are set and maintained (the authoritative copy) by cloud 102. Cloud interface 514 in conjunction with the data synchronization subsystem of synchronizer 512 detects permission changes at cloud 102 and synchronizes the permissions. The permission changes are synchronized at the next data synchronization cycle or when the customer explicitly calls for reset permissions from the reset permissions tab.

When it determined that it is time to synchronize the permissions cloud interface 514, in conjunction with synchronizer 512, does the following. First, cloud interface 514 calls the cloud 102 API to download the cloud permissions for the domain (e.g., set of files, workgroup, etc. for a particular customer). The permissions are encoded in an XML file, which is then persisted to disk. At all times there should be only 1 copy of the file on disk. The permission synchronization can occur if explicitly invoked via LUI for a permission synchronization or automatically if permissions change in the cloud files system at cloud 102 or local cloud 104.

Next, cloud interface 514 processes the permissions XML file and encodes the permissions into 2 JSON files and stores the files in JSON storage 516. When the permissions are being processed there can be 2 copies of each file indexed by a monotonically increasing number. However, after the permissions are processed there should be only one copy of each file.

Once the JSON files are created cloud interface 514 sends a message, via messaging subsystem 522, to sweeper 520 to indicate that a new permission file is available for processing by permission backend 510. The message is sent via a Unix socket. Once the message is sent, permission backend 510 will start processing the JSON files in JSON storage 516. The new permission schema will not be effective until the downloaded permission file is completely processed.

Permission backend 510 takes the JSON file(s) downloaded by the cloud interface and loads it/them in to a structure that the permission enforcement module of VFS module 506 can understand. Once the JSON files are converted to this format, a file (permissions map 508) that can be reloaded to memory when the system restarts is persisted to disk, which eliminates the need to reprocess the JSON files. At any time, permission enforcement should not and need not be interrupted. Therefore, no client should ever loose share access due to a data or permission synchronization. In previous versions we walk the file system to reset permissions. This step in unnecessary in the disclosed example embodiment.

Permissions map 508 contains an in-memory representation of the permission framework. Permission backend 510 is also responsible for converting a given file path to an ACL that represents the cloud permission enforcement. The permissions are enforced based on this resolved ACL.

The permission enforcement subsystem of VFS Module 506 intercepts the filesystem calls Samba 504 makes and enforces cloud permissions on them. The credentials for permission enforcement are determined from the euid of the process and the process owner's primary and supplementary group ids. The ACL is provided by permission backend 510. Once the permission is enforced, VFS module 506 becomes a "super user" and performs the operation to override the operating system permission enforcement. In other words, VFS module 506 has access to at least all of the client user files in local file system 502.

The permission enforcement operations can be categorized in to 3 different sections. First, there can be permission enforcement based on paths. For example, paths/,/Shared, /Private and /Private/<user name>/ directories have special permissions regardless of what ACL is set on it. Second, there can be user enforcement based on trustees. For example, the enforcement is done based on the ACL set on the filesystem object. The ACL is compared with the requested operation and the trustees (i.e the euid of the process and primary an supplementary group ids of the euid) and the operations performed by the trustees. Third, there can be permission enforcement based on implicit permissions. For example, the Administrators group can have special permissions. Additionally, special permissions can be enforced for windows special temp files to make sense of the duality of cloud delete permission semantics.

The following is a summary of the relationships and functions of the components and subcomponents of FIG. 5. Some of the subcomponents are not explicitly shown in FIG. 5.

The Cloud API 514 communicates with the server and the permission interpreter. The permission interpreter is embedded in permission backend 510 and is operative to move permissions between either the server via the Cloud API, or the UI via the UI Backend, and the core permission handling components of the client backend. The permission interpreter will perform any marshalling/unmarshalling and will pass the permissions to the permission backend API or the messaging API. The UI Backend is embedded in local user interface (UI) 524. It is the backend of the UI 524, and interacts with the web UI (Local User Interface 524) to communicate changes to the Permission Interpreter, or to the Enforcement Engine to determine whether to permit operations. The web UI (Local User Interface 524) passes permissions updates and operation validation requests to the UI Backend.

The permission backend API is embedded in permission backend 510 and is the interface to the permission backend storage (storage for permission map 508). It will service requests to read or write permissions from the permission interpreter, messaging API or sweeper 520. The following calls will be provided to the Sweeper:
1. "int get_permission_map_size(char *path) returns the in-memory size of the map, or −1 on failure.
2. int populate_permission_map(void *addr, char *path) populates the address with the permission map. It returns −1 on failure.

The permission backend storage provides on-disk storage of the permissions map and is accessed through the permission backend API. It also performs any necessary format conversion for disk storage.

The messaging API is embedded in messaging 522 and provides an interface to sweeper 520. Sweeper 520 receives messages from the permissions interpreter and config file API. These messages include, but are not limited to: notification of a new permission map to load into memory; notification of an update to apply to the current permission map; request to decrease the memory footprint; and request to increase the memory footprint. Sweeper 520 will perform the work associated with these messages.

The high level flow to update a new permission map 508 is as follows. First, permissions interpreter messages sweeper 520 that a new permission map 508 is available, providing the size and path. Then, sweeper 520 gets the shared memory key for the new memory map segment. Next, sweeper 520 requests the in-memory map size from the permissions backend API given the path. Then, sweeper 520 creates the new shared memory segment. Next, sweeper 520 will call the permissions backend API, providing the path and size of the map, and the address of the shared memory segment. Then, permissions backend API will process the on-disk permissions map and write the in-memory format of the map into shared memory. Finally, sweeper 520 will mark this new shared memory segment as the new in-memory permissions map 508.

Permission map 508 is the in-memory data structure representation of the current permissions. This will be updated by sweeper 520 and provided to VFS module 506. Lookup TLB is a cache of the n most recent lookups of permissions associated with a path.

For OLC, on the NAS appliance, VFS module 506 sits between the Linux file system (e.g., local file system 502) syscall interface and Samba 504. It will intercept all file operations and call the permission enforcement engine to determine whether to allow or disallow the operation.

It is suggested to allow all operations for file types other than regular file or directory (S_ISREG|S_ISDIR).

The enforcement engine checks the credentials of operations against the ACL and determines whether to allow the operation. For performance, the enforcement engine will rely upon ordering of the Aces within the ACL to be the administrator, then other users, then groups. This will be called by VFS Module 506 to validate operation requests from the mapped drive, or by the UI Backend to validate operation requests from the Web UI 524, so that permissions are enforced consistently.

The presentation engine provides a view to the user of the permissions on the file system.

The config file API is an interface to manage configuration parameters. Operations of the config file API include, but are not limited to: sweep frequency; sweep memory usage; cache size; and permission filtering functionality.

Samba 504 is the file mapping component between the user applications 108 and the on disk data. The VFS Module 506 intercepts Samba file operations and performs any enforcement or translation.

Figure 6:
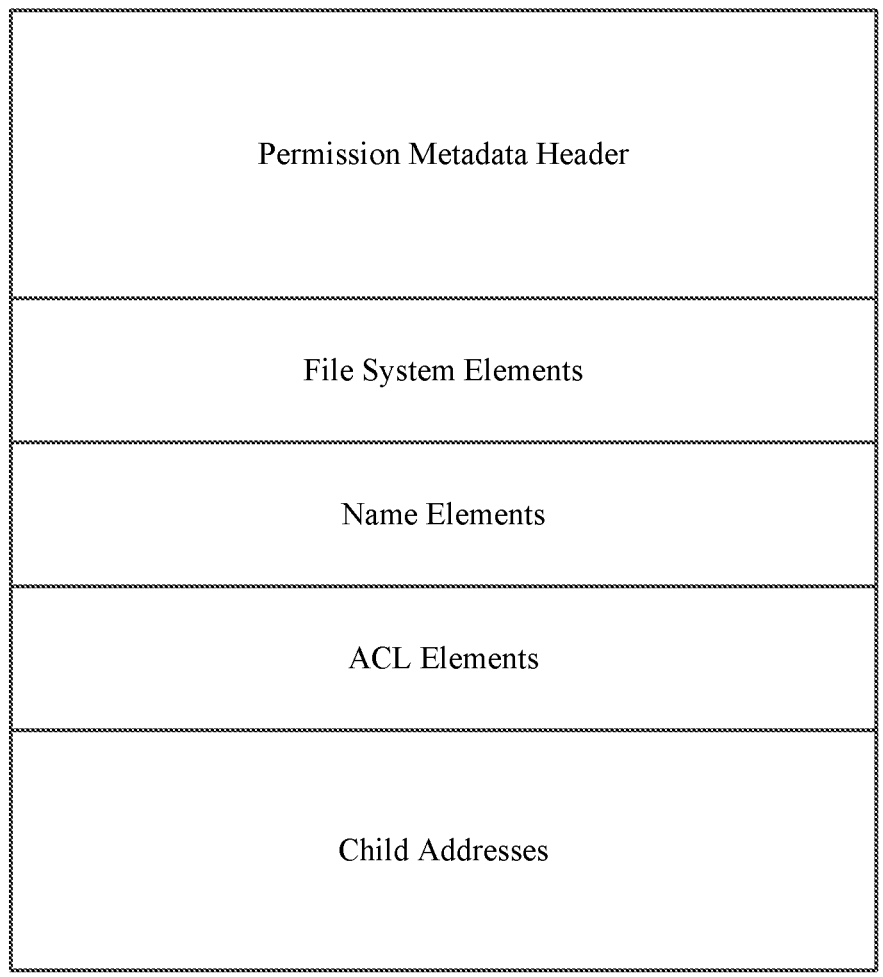
FIG. 6 is an example data structure for in-memory permissions.

FIG. 6 is an example data structure for in-memory permissions map 508. Some properties of the example data structure are as follows. The data structure is contained within a contiguous virtual memory segment. In addition, the data structure can be persisted to disk without any marshalling and can be read back to memory without any unmarshalling. It can handle variable size data and provides optimum space utilization. In addition, all locations are addressed within the memory segment, and addressing is independent of the location where the memory is created. The data structure maintains the filesystem tree hierarchy and is easy and efficient to search. It is also, extensible and can be extended to load on demand.

FIG. 7 is an example data structure for the permission metadata header field of the data structure of FIG. 6. Some properties of the header field are as follows. The header consist of permission area meta data and section location information. Each section includes an "offset" field, a "size field", and a "next free offset" field. The "offset" field includes data indicative of the position of the start of the section relative to the beginning of the memory area. The "size" field includes data indicative of the full size of the area. The "next free offset" field includes data indicative of the next free space within the section.

The "Next Map" field is useful in the federation of maps. It facilitates loading the maps into memory on demand. It is used similar to virtual memory paging and can be scaled to the map size.

Figure 8:
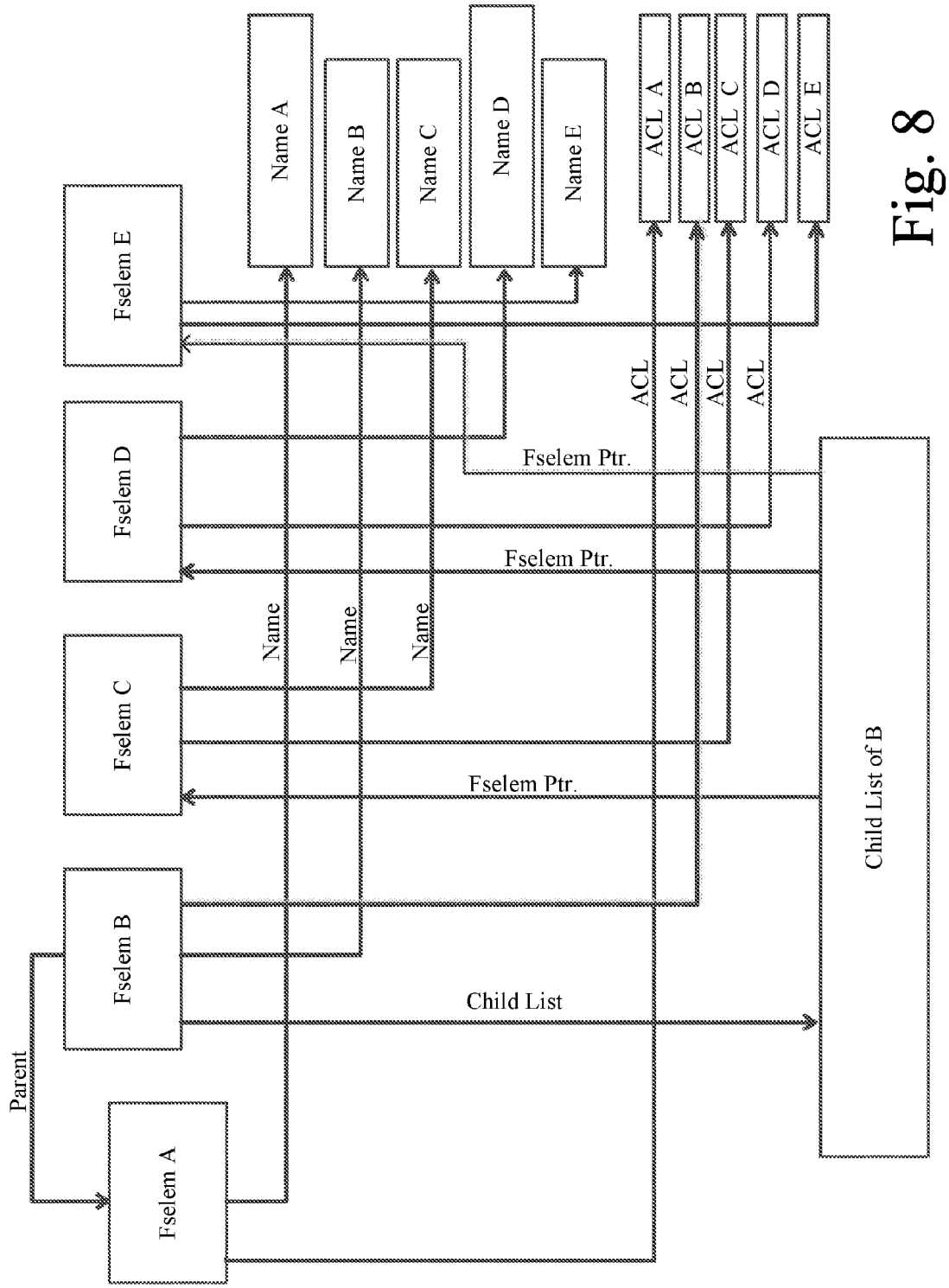
FIG. 8 is a diagram illustrating the relationships between file system elements of the virtual file system permissions framework.
Figure 9:
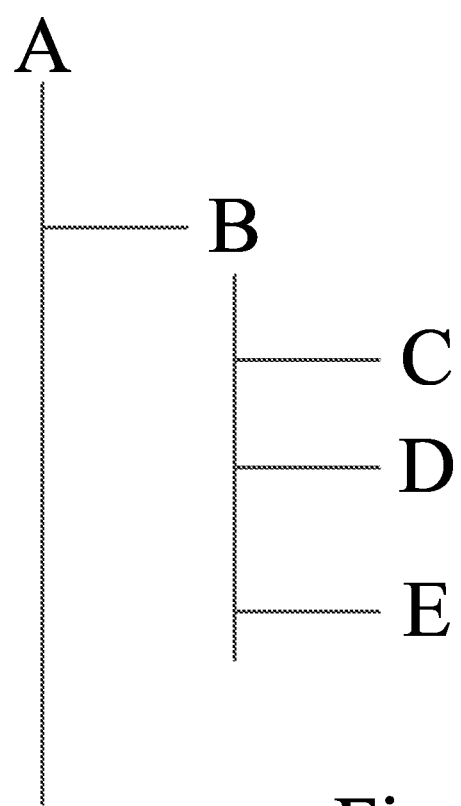
FIG. 9 is a directory structure corresponding to the relational diagram of FIG. 6.

FIG. 8 is an example relational diagram for stored objects, corresponding to the data structure of FIGS. 6-7. Features of the object relationships include, but are not limited to, the following. An Fselem (file system element) object will hold the offset of its parent and a pointer to name and ACL objects. The parent pointer is to another Fselem object. An Fselem will also hold a pointer to its child list. The child list holds pointers to child fselem objects. This is recursive tree search enabled. The leaf and root object(s) is/are specially marked. The ACL and Name objects are variable size, but the Fselem objects are fixed size. Finally, the child list objects are variable size FIG. 9 is a directory structure corresponding to the relational diagram of FIG. 8. This illustrates that relationships in a conventional file directory tree can be maintained in the example permissions data structure of the present invention and used to convert a conventional permissions directory tree to an associated permissions database.

Figure 10:
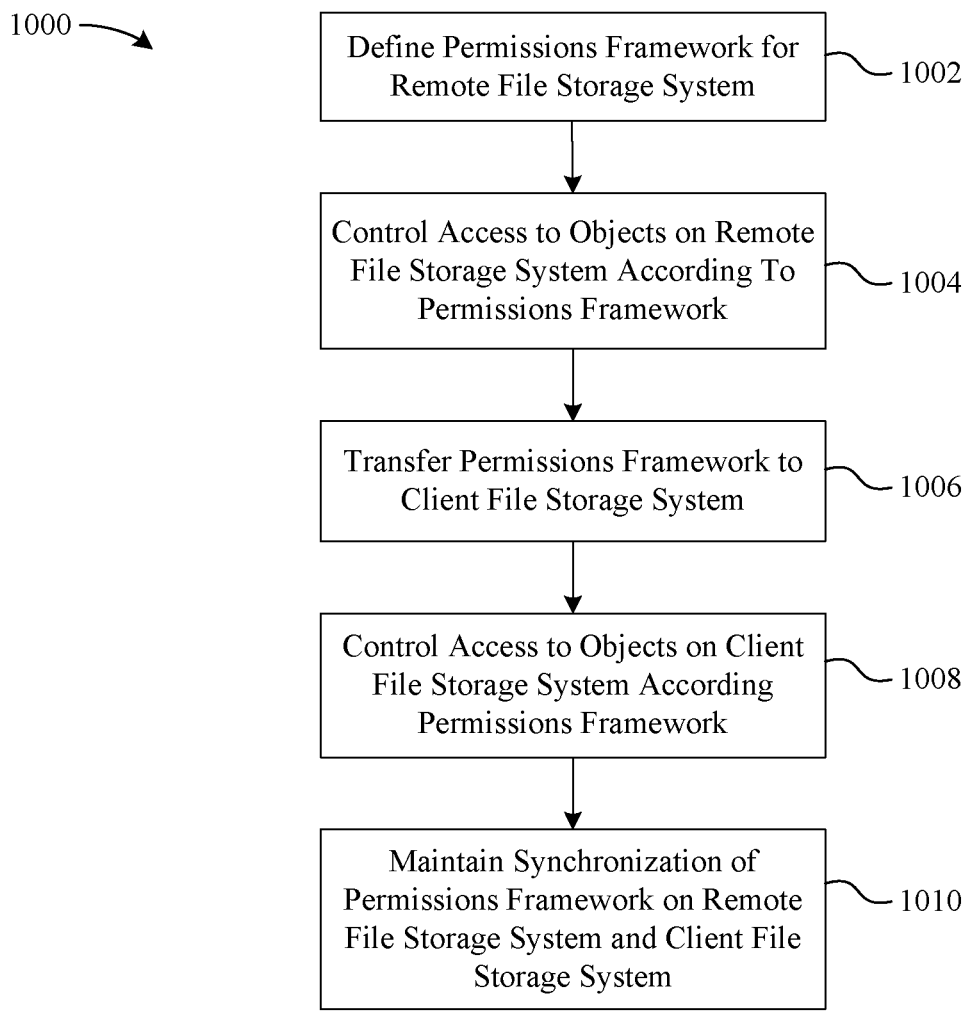
FIG. 10 is a flow chart summarizing one example method of implementing a permissions framework of the present invention.

FIG. 10 is a flow chart 1000 summarizing an example method of implementing a permissions framework of the present invention. In a first step 1002 a permissions framework for a remote file storage system is defined. Then, in a second step 1004, access to objects on the remote file storage system is controlled according to the permissions framework. Next, in a third step 1006, the permissions framework is transferred to a client file storage system. Then, in a fourth step 1008, access to objects on the client file storage system is controlled according to the permissions framework. Finally, in a fifth step 1010, synchronization of the permissions framework on the remote file storage system and the client file storage system is maintained.

The description of particular embodiments of the present invention is now complete. Many of the described features may be substituted, altered, or omitted without departing from the scope of the invention. For example, in the described embodiment, newly created files and folders will inherit the permissions associated with the parent folder of the newly created file. However, some other default permissions scheme can be used for newly created files. Also, specific examples of commercially available components (e.g., WINDOWS® client, Samba, etc.) are provided. However, the invention can be practiced with any type of client system, operating system, file system, and so on. These and other deviations from the particular embodiments shown will be apparent to those skilled in the art, particularly in view of the foregoing disclosure.

We claim:

1. A method of managing file permissions in a remote file storage system, said method comprising:
defining permissions for said remote file storage system;
controlling access to objects on said remote file storage system according to said permissions of said remote file storage system;
transferring said permissions to a client file storage system remote from said remote file storage system;
controlling access to objects on said client file storage system according to said permissions of said remote file storage system;
altering said permissions of said remote file storage system at said remote file storage system;
controlling access to objects on said remote file storage system according to said altered permissions of said remote file storage system;
transferring said altered permissions to said client file storage system; and
controlling access to objects on said client file storage system according to said altered permissions of said remote file storage system; and wherein
said step of controlling access to objects on said client file storage system according to said permissions of said remote file storage system includes overriding permissions of said client file storage system.

2. The method of claim 1, additionally comprising:
defining a virtual file system structure for said objects on said remote file storage system; and
defining said permissions based at least in part on said virtual file system structure.

3. The method of claim 1, wherein said step of transferring said altered permissions to said client file storage system occurs in conjunction with a data synchronization process between said remote file storage system and said client file storage system.

4. The method of claim 1, wherein said step of transferring said altered permissions to said client file storage system occurs in response to a command from a user.

5. The method of claim 1, wherein said step of transferring said altered permissions to said client file storage system occurs in response to said step of altering said permissions.

6. The method of claim 1, additionally comprising:
locally altering said permissions of said remote file storage system at said client file storage system;
controlling access to objects on said client file storage system according to said locally-altered permissions of said remote file storage system;
transferring said locally-altered permissions to said remote file storage system; and
controlling access to objects on said remote file storage system according to said locally-altered permissions of said remote file storage system.

7. The method of claim 6, wherein said step of transferring said locally-altered permissions to said remote file storage system occurs in conjunction with a data synchronization process between said remote file storage system and said client file storage system.

8. The method of claim 6, wherein said step of transferring said locally-altered permissions to said remote file storage system occurs in response to a command from a user.

9. The method of claim 6, wherein said step of transferring said locally-altered permissions to said remote file storage system occurs in response to said step of locally altering said permissions of said remote file storage system at said client file storage system.

10. The method of claim 1, wherein said step of defining permissions for said remote file storage system includes associating access control lists with said objects on said remote file storage system.

11. The method of claim 1, additionally comprising:
defining a plurality of permissions sets for said remote file storage system;
associating each of said permissions sets with a respective one of a plurality of clients;
controlling access to objects on said remote file storage system by said clients according to said permissions sets of said remote file storage system;
transferring each of said permissions sets to a respective one of a plurality of client file storage systems each associated with one of said plurality of clients, said client file storage systems being remote from said remote file storage system; and
controlling access to objects on said client file storage systems according to said permission sets of said remote file storage system associated with said clients.

12. A remote file storage system comprising:
memory for storing file objects received from a client;
a client interface operative to receive said file objects from said client, to provide said file objects to said client, to receive data indicative of permissions associated with said file objects, and to provide a permissions file to said client;
a permissions file generator operative to generate said permissions file based on said data indicative of said permissions associated with said file objects, said permissions file defining different permissions for a plurality of said file objects; and
a permissions enforcer operative to control access to said file objects according to said permissions file; and
wherein
said client interface is operative to receive additional data indicative of permissions associated with said file objects;
said permissions file generator is operative to generate an updated permissions file based at least in part on said additional data indicative of permissions associated with said file objects; and
said client interface is operative to provide said updated permissions file to said client.

13. The system of claim 12, additionally comprising:
a processing unit; and wherein
said permissions file generator and said permissions enforcer are code modules executed by said processing unit.

14. The system of claim 12, additionally comprising:
a virtual file system module operative to define a virtual file system structure for said file objects; and wherein
said permissions file generator is operative to generate said permissions file based at least in part on said virtual file system structure.

15. The system of claim 12, additionally comprising a synchronizer operative to:
synchronize said file objects stored on said remote file storage system with file objects stored on a file storage system of said client; and
synchronize said permissions file with a permissions file on said file storage system of said client.

16. The system of claim 12, wherein said permissions file associates access control lists with said file objects.

17. A local file storage system for use with a remote file storage system, said local file storage system including:
memory for storing local file objects from local clients;
a client interface operative to receive said local file objects from said local clients and to provide said local file objects to said local clients;
a remote file server interface operative to receive a permissions file from a remote file server, said permissions file being indicative of permissions associated with remote file objects stored on said remote file server, said remote file objects being copies of said local file objects; and
a permissions enforcer operative to control access to said local file objects by said local clients according to said permissions defined by said permissions file for said remote file objects; and wherein
said remote file server interface is further operative to receive an updated permissions file from said remote file server, said updated permissions file being indicative of updated permissions associated with at least some of said remote file objects stored on said remote file server; and
said permissions enforcer is further operative to control access to said local file objects by said local clients according to said updated permissions defined by said updated permissions file for said remote file objects.

18. The system of claim 17, additionally comprising:
a virtual file system module operative to present a virtual file system structure associated with said local file objects to said local clients; and wherein
said permissions file is based at least in part on said virtual file system structure.

19. The system of claim 18, wherein said permissions file associates access control lists with elements of said virtual file system structure.

20. A file storage system comprising:
a local file storage system including memory, said local file storage system being operative to store file objects from local clients in said memory and to provide said file objects to said local clients from said memory;

a remote file storage system including memory, said remote file storage system being operative to store copies of said file objects in said memory of said remote file storage system and to provide said copies of said file objects from said memory of said remote file storage system;

a permissions file generator on at least one of said local file storage system and said remote file storage system and operative to generate a permissions file and to provide said permissions file to said local file storage system and said remote file storage system;

a first permissions enforcer on said local file storage system, said first permissions enforcer operative to control access to said file objects on said local file storage system according to said permissions file; and a second permissions enforcer on said remote file storage system, said second permissions enforcer operative to control access to said file objects on said remote file storage system according to said permissions file; and wherein responsive to receiving additional data indicative of permissions associated with said file objects stored on said remote file storage system, said permissions file generator is further operative to generate an updated permissions file based at least in part on said additional data and provide said updated permissions file to said local file storage system and said remote file storage system;

responsive to receiving said updated permissions file, said first permissions enforcer is operative to control access to said file objects on said local file storage system according to said updated permissions file; and responsive to receiving said updated permissions file, said second permissions enforcer is operative to control access to said file objects on said remote file storage system according to said updated permissions file.

21. The system of claim 20, additionally comprising:

a file object synchronizer operative to synchronize said file objects stored on said remote server and said file objects stored on said local server; and a permissions file synchronizer operative to synchronize said permissions file on said remote server and said permissions file on said local server.

22. The system of claim 20, wherein said permissions file defines different permissions for a plurality of said file objects.

23. The method of claim 1, wherein said step of transferring said permissions to a client file storage system remote from said remote file storage system includes transferring permissions information defining different permissions for a plurality of said objects.

24. The system of claim 17, wherein said permissions file defines different permissions for a plurality of said remote file objects.

25. The system of claim 17, wherein said permissions enforcer is operative to control access to said local file objects by analyzing said permissions file and overriding local permissions to grant or deny access to said local file objects.

26. The method of claim 1, wherein said step of transferring said permissions to a client file storage system remote from said remote file storage system occurs over a wide area network.

* * * * *